United States Patent
Notani et al.

(10) Patent No.: US 6,556,071 B2
(45) Date of Patent: Apr. 29, 2003

(54) SEMICONDUCTOR INTEGRATED CIRCUIT

(75) Inventors: Hiromi Notani, Tokyo (JP); Hiroshi Makino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/098,432

(22) Filed: Mar. 18, 2002

(65) Prior Publication Data

US 2003/0062948 A1 Apr. 3, 2003

(30) Foreign Application Priority Data

Sep. 28, 2001 (JP) ..................... 2001-298879

(51) Int. Cl.$^7$ .................................. G05F 1/10
(52) U.S. Cl. ......................... 327/544; 326/81
(58) Field of Search ............... 326/17, 31, 34, 326/83, 86, 112, 119, 121; 327/530, 534, 535, 536, 537, 538, 539, 540, 541, 543, 544

(56) References Cited

U.S. PATENT DOCUMENTS

| | | | | |
|---|---|---|---|---|
| 4,859,870 A | * | 8/1989 | Wong et al. | 327/108 |
| 5,274,601 A | * | 12/1993 | Kawahara et al. | 365/230.06 |
| 5,583,457 A | * | 12/1996 | Horiguchi et al. | 326/121 |
| 5,614,847 A | * | 3/1997 | Kawahara et al. | 326/98 |
| 5,650,742 A | * | 7/1997 | Hirano | 327/333 |
| 5,726,562 A | * | 3/1998 | Mizuno | 323/312 |
| 5,781,062 A | * | 7/1998 | Mashiko et al. | 327/544 |
| 5,880,623 A | * | 3/1999 | Levinson | 327/540 |
| 6,049,245 A | * | 4/2000 | Son et al. | 327/544 |
| 6,208,170 B1 | * | 3/2001 | Iwaki et al. | 326/121 |
| 6,285,213 B1 | | 9/2001 | Makino | |

FOREIGN PATENT DOCUMENTS

JP 11-214962 8/1999

OTHER PUBLICATIONS

U.S. patent application No. 09/758,360, filed Jan. 12, 2001.
H. Notani, et al., "A 0.9–μA Standby Current DSP Core Using Improved ABC–MT–CMOS with Charge Pump Circuit", 2001 Symposium on VLSI Circuits Digest of Technical Papers, Business Center for Academic Societies Japan, Tokyo, Japan, Jun. 14–16, 2001, pp. 221–224.
H. Notani, et al., "A 0.9–μA Standby Current DSP Core Using Improved ABC–MT–CMOS with Charge Pump Circuit", Technical Report of IEICE, The Institute of Electronics, Information and Communication Engineers, Tokyo Japan, Aug. 3, 2001, pp. 9–14.

* cited by examiner

*Primary Examiner*—Jeffrey Zweizig
(74) *Attorney, Agent, or Firm*—Burns, Doane, Swecker & Mathis, LLP

(57) ABSTRACT

On a sleep state, a voltage dropping circuit 2 supplies a power supply line VA1 with a voltage obtained by dropping a voltage of a power supply line VA2, instead of a voltage in accordance with ON state of a switch QA1. A power supply line GND has a voltage equal to the ground voltage. A charge pump circuit 10 outputs the ground voltage on an active state. The charge pump circuit 10 outputs a voltage which is lower than the ground voltage, on the sleep state. A source electrode and a substrate electrode are connected to the power supply lines VA1 and VA2 in each of PMOS transistors Q3 and Q4 of an internal circuit 1 (latch circuit), respectively. A source electrode is connected to the power supply line GND in each of nMOS transistors Q5 and Q6 of the internal circuit 1. A substrate electrode is supplied with the voltage which is outputted from the charge pump circuit, in each of the nMOS transistors Q5 and Q6 of the internal circuit 1. As a result, it is possible to reduce a leakage current withholding data in the internal circuit on the sleep state, even if the supply voltage drops on the sleep state.

10 Claims, 6 Drawing Sheets

SEMICONDUCTOR INTEGRATED CIRCUIT

BACKGROUND OF THE INVENTION

1. Field of the Invention

This invention relates to a semiconductor integrated circuit capable of reducing a power consumption by controlling supply of power for an internal circuit in accordance with an active state and a sleep state of the internal circuit.

2. Description of the Prior Art

FIG. 4 is a semiconductor integrated circuit which is disclosed in JP-A 11-214962(1999). The semiconductor integrated circuit comprises: p-channel field effect transistors (hereinafter, referred to as pMOS transistors) QA1 to QA3, an n-channel field effect transistor (referred to as an nMOS transistor) QB1, and diodes D1 and D2. The pMOS transistor QA1 is connected between a power supply line VDD1 and a virtual or pseudo power supply line VA1 to be used as a switch for a power supply. The pMOS transistor QA2 is connected between the power supply line VDD1 and a substrate power supply line VA2. The pMOS transistor QA3 is connected between the substrate power supply line VA2 and a power supply line VDD2. The nMOS transistor QB1 is connected between a power supply line GND and a virtual power supply line VB1 to be used as a switch for a power supply. The diode D1 is connected between the virtual power supply line VA1 and the substrate power supply line VA2. The diode D2 is connected between the power supply line GND and the virtual power supply line VB1. An internal circuit is connected between the virtual power supply lines VA1 and VB1 which feed operation power supplies to the internal circuit. The internal circuit includes a latch circuit having pMOS transistors Q3 and Q4 and nMOS transistors Q5 and Q6 each having a threshold voltage lower in absolute value than each of the transistors QA1 to QA3 and QB1.

The power supply line VDD1 is supplied with a voltage having a voltage value LVDD. The power supply line VDD2 is supplied with a voltage having a voltage value HVDD which is higher than the voltage value LVDD. The transistors QA1, QA2, and QB1 are controlled in response to control signals CS1 and CSB1, and are simultaneously put into ON state when the internal circuit is at an active state, while the transistors QA1, QA2, and QB1 are put into OFF state when the internal circuit is at a sleep state. The transistor QA3 is controlled by the control signal CS1, and is put into OFF state when the internal circuit at the active state, while the transistor QA3 is put into ON state when the internal circuit is at the sleep state.

A substrate potential is applied by a reverse bias to a source of each of the transistors Q3 to Q6 by the diodes D1 and D2 so that the absolute value of the threshold voltage may increase in each of the transistors Q3 to Q6 when the internal circuit is especially at the sleep state. In a case where the internal circuit has a sequence circuit such as latch circuits, it is possible to reduce a leakage current when the internal circuit is at the sleep state, without losing data which is held in the sequence circuit on the active state.

It will be assumed that potential differences V1 and V2 occur on the basis of the diodes D1 and D2, respectively, in the semiconductor integrated circuit illustrated in FIG. 4. The reduction ratio varies in concern to the leakage current on the sleep state on the basis of the potential differences V1 and V2. As the potential differences V1 and V2 become greater and greater, a body effect becomes greater, which enhances the reduction ratio of the leakage current. On the other hand, it is necessary to supply the internal circuit with a supply voltage in which the internal circuit can hold the data therein on the sleep state. Therefore, it is necessary to determine the potential differences V1 and V2 so that the voltage (HVDD−V1−V2) becomes greater than the supply voltage which is supplied to the internal circuit on the sleep state. It will be assumed that the voltage value HVDD is equal to 3.3 V which is usually used as an I/O supply voltage which is an input-output buffer connected between the internal circuit and external signal pins.

Furthermore, it will be assumed that the supply voltage is equal to 0.9 V which is supplied to the internal circuit on the sleep state. When the potential difference V1 is equal to the potential difference V2, each of the potential differences V1 and V2 becomes 1.2 V in maximum. As a result, it is possible to reduce the leakage current in 1.5 to 2 orders of magnitude. However, it is also necessary to lower the I/O supply voltage for reduction of the power consumption. For example, the I/O supply voltage of 2.5 V is used in a specific one of the semiconductor integrated circuits. In a case where the voltage value HVDD is equal to 2.5 V when the supply voltage of 0.9 V is supplied to the internal circuit on the sleep state, each of the potential differences V1 and V2 becomes 0.8 V in maximum. The leakage current merely reduces in an order of magnitude. In other words, there is a drawback in which the reduction ratio of the leakage current decreases inasmuch as the reverse bias is shallow low when the voltage value HVDD is brought to a low voltage.

SUMMARY OF THE INVENTION

It is an object of this invention to provide a semiconductor integrated circuit capable of reducing a leakage current with holding data in an internal circuit on a sleep state, even if a supply voltage to be used on the sleep state is lowered.

A semiconductor integrated circuit according to this invention comprises a first switch for supplying a first voltage to a first power supply line when the first switch is put into ON state and a voltage dropping circuit, arranged between the first power supply line and a second power supply line, for supplying the first power supply line with a voltage which is obtained by dropping the voltage of the second power supply line, when the first switch is put into OFF state. The semiconductor integrated circuit further comprises a third power supply line having a second voltage which is lower than the first voltage, a fourth power supply line, and a voltage generating circuit for generating a third voltage lower than the second voltage, to supply the third voltage to the fourth power supply line when the first switch is put into OFF state. The voltage generating circuit generates a high voltage higher than the third voltage, to supply the high voltage to the fourth power supply line when the first switch is put into ON state.

In an internal circuit, a p-channel field effect transistor has a source terminal and a substrate terminal which are connected to the first power supply line and the second power supply line, respectively. On the other hand, an n-channel field effect transistor has a source terminal and a substrate terminal which are connected to the third power supply line and the fourth power supply line, respectively.

Inasmuch as the third power supply line has the second voltage, the voltage of the third power supply line does not rise on the sleep state in comparison with the active state. Accordingly, it is possible for the internal circuit to maintain the voltage between the first and the third power supply lines, at a voltage in which the internal circuit can keep the data held on the active state, when the internal circuit is at the sleep state. Furthermore, it is possible to reduce the leakage current on the sleep state in the n-channel field effect transistor inasmuch as the substrate potential is applied as the reverse bias to the n-channel field effect transistor of the internal circuit so that the absolute value of the threshold voltage increases in the n-channel field effect transistor, when the internal circuit is at the sleep state. On the other hand, the leakage current decreases in the p-channel field effect transistor by operation of the voltage dropping circuit, when the internal circuit is at the sleep state.

The voltage generating circuit comprises an oscillator for generating an oscillation signal having a predetermined amplitude when the first switch is put into OFF state. The oscillator stops generation of the oscillation signal when the first switch is put into ON state. The voltage generating circuit further comprises a charge pump for generating the third voltage in accordance with the oscillation signal. Therefore, the oscillator stops the oscillation when the internal circuit is at the active state. It is possible to save the power consumption based on the oscillation.

The voltage generating circuit further comprises a level detector for comparing a predetermined voltage with the voltage of the fourth power supply line, to produce a comparison result between the predetermined voltage and the voltage of the fourth power supply line. When the oscillator generates the oscillation signal in accordance with the comparison result produced by the level detector, it is possible to generate the third voltage with stopping the oscillation of the oscillator, even though the internal circuit is at the sleep state. As a result, it is possible to save the power consumption caused by the oscillation.

The voltage generating circuit further comprises a switch circuit connected to the third and the fourth power supply lines. The switch circuit is put into ON state when the first switch is put into ON state. The voltage of the fourth power supply line quickly varies to the second voltage when the internal circuit is at the active state.

The semiconductor integrated circuit further comprises a voltage control circuit for supplying the second power supply line with a fourth voltage higher than the first voltage which is supplied to the first power supply line on putting the first switch into ON state, when the first switch is put into OFF state.

More specifically, the voltage control circuit comprises a second switch, connected to the second power supply line, for being put into ON state when the first switch is put into ON state. The voltage control circuit further comprises a third switch, connected to the second power supply line, for being put into ON state to supply the fourth voltage to the second power supply line. The first switch may have first and second terminals which are connected to the second switch and the first power supply line, respectively. The first terminal is supplied with a supply voltage. Alternatively, the voltage control circuit comprises a second switch, connected to the first and second power supply lines, for being put into ON state when the first switch is put into ON state. The voltage control circuit further comprises a third switch, connected to the second power supply line, for being put into ON state to supply the fourth voltage to the second power supply line. In this case, the first switch may have a first terminal which is supplied with a supply voltage. The first switch may have a second terminal which is connected to the second switch and the first power supply line.

The voltage dropping circuit includes a diode or a plurality of diodes connected to one another in series. The diode or the diodes are connected between the first and the second power supply lines. Alternatively, the voltage dropping circuit may include a field effect transistor or a plurality of field effect transistors connected to one another in series, instead of the diode or the diodes. When the voltage dropping circuit includes the field effect transistor or the field effect transistors, it is possible to adjust the potential difference between the first and the second power supply lines on varying the voltage supplied to each substrate electrode of the field effect transistor or the field effect transistors.

DETAILED DESCRIPTION OF THE PREFERRED EMBODIMENTS

Figure 1:
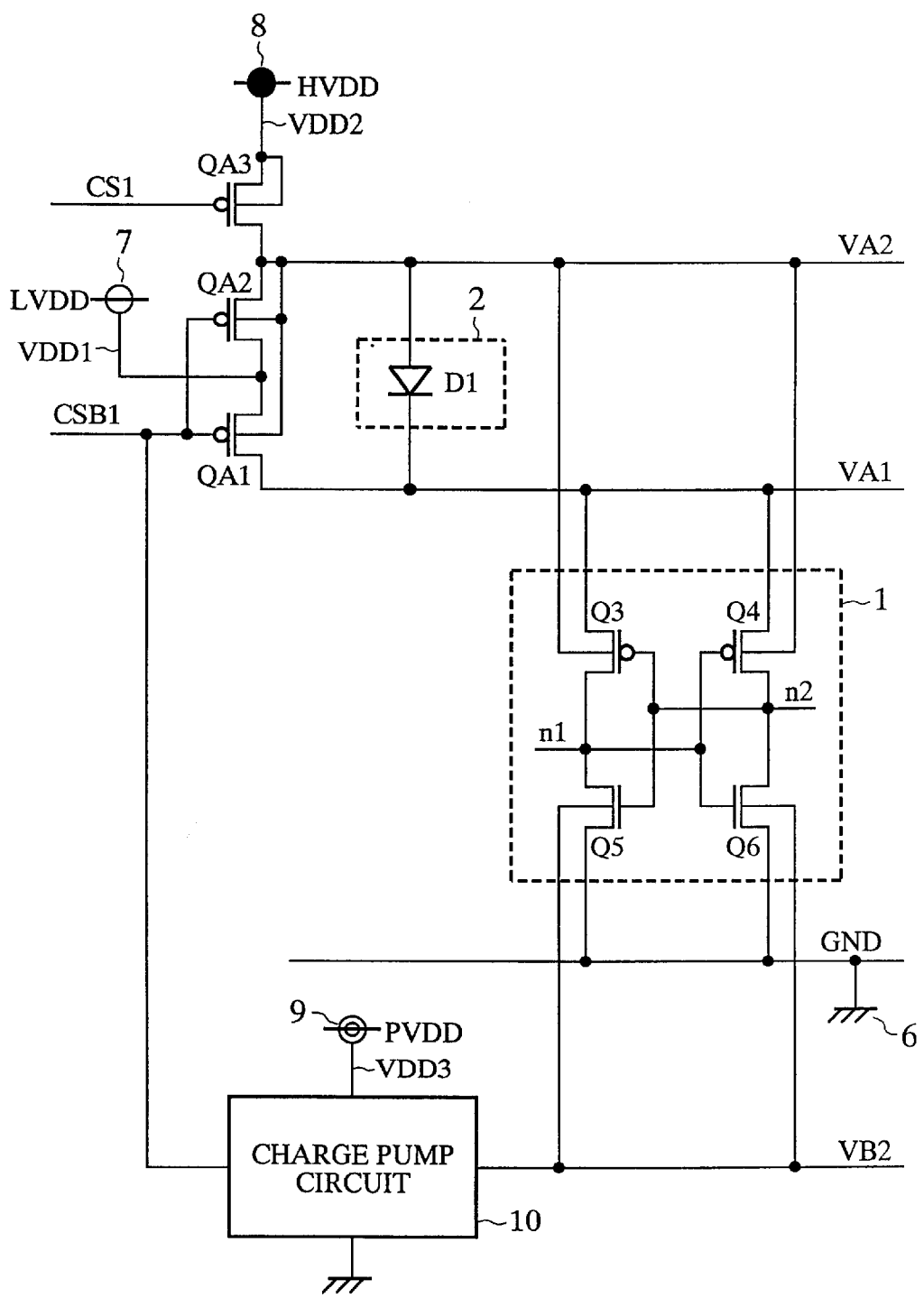
FIG. 1 is a circuit diagram for illustrating a semiconductor integrated circuit according to an embodiment 1 of this invention.

Description will be made as regards embodiments of this invention with reference to drawings. Here, similar parts or corresponding parts are designated by like reference numerals in the drawings.

EMBODIMENT 1

FIG. 1 is a circuit diagram for illustrating a semiconductor integrated circuit according to an embodiment 1 of this invention. The semiconductor integrated circuit comprises power supply lines VDD1, VDD2, and GND, a virtual power supply line VA1, substrate power supply lines VA2 and VB2, a voltage dropping circuit 2, pMOS transistors QA1, QA2, and QA3, and a charge pump circuit 10. Each of the pMOS transistors QA1, QA2, and QA3 is used as a power supply switch for controlling the supply of a supply voltage to each power supply line.

In the pMOS transistor QA1, one of source-drain electrodes is connected to the power supply line VDD1. Another one of the source-drain electrodes is connected to the virtual power supply line VA1. A substrate electrode is connected to the substrate power supply line VA2. A control signal CSB1 is supplied to a gate electrode.

In the pMOS transistor QA2, one of source-drain electrodes is connected to the power supply line VDD1. Another one of the source-drain electrodes is connected to the substrate power supply line VA2. A substrate electrode is connected to the substrate power supply line VA2. The control signal CSB1 is supplied to a gate electrode.

In the pMOS transistor QA3, a source electrode is connected to the power supply line VDD2. A drain electrode is connected to the substrate power supply line VA2. A substrate electrode is connected to the power supply line VDD2. A control signal CS1 is supplied to a gate electrode.

The voltage dropping circuit 2 is connected to the virtual power supply line VA1 and the substrate power supply line VA2, and supplies the virtual power supply line VA1 with a potential lower than that of the substrate power supply line VA2 on the sleep state. The voltage dropping circuit 2 includes a diode D1 whose anode is connected to the substrate power supply line VA2. The cathode of the diode D1 is connected to the virtual power supply line VA1.

The charge pump circuit 10 is supplied with the voltages on the power supply lines VDD3 and GND, and drives the substrate power supply line VB2 in response to the control signal CSB1.

An internal circuit 1 is a logic circuit provided with a CMOS structure which operates with the voltages of the virtual power supply line VA1 and the power supply line GND as power supplies.

In each pMOS transistor of the internal circuit 1, a substrate electrode is connected to the substrate power supply line VA2. A source electrode is connected to the virtual power supply line VA1 directly or through another pMOS transistor. Similarly, a substrate electrode is connected to the substrate power supply line VB2 in each NMOS transistor of the internal circuit 1. A source electrode is connected to the power supply line GND directly or through another nMOS transistor. As one example illustrated in FIG. 1, the internal circuit 1 comprises a latch circuit having two pMOS transistors Q3 and Q4 and two nMOS transistors Q5 and Q6.

The pMOS transistor Q3 has a source terminal connected to the virtual power supply line VA1. The drain terminal of the pMOS transistor Q3 is connected to a memory node n1. The gate electrode of the pMOS transistor Q3 is connected to a memory node n2. The substrate electrode of the pMOS transistor Q3 is connected to the substrate power supply line VA2. The pMOS transistor Q4 has a source terminal connected to the virtual power supply line VA1. The drain terminal of the pMOS transistor Q4 is connected to the memory node n2. The gate electrode of the pMOS transistor Q4 is connected to the memory node n1. The substrate electrode of the pMOS transistor Q4 is connected to the substrate power supply line VA2.

The nMOS transistor Q5 has a source terminal connected to the power supply line GND. The drain terminal of the nMOS transistor Q5 is connected to the memory node n1. The gate electrode of the nMOS transistor Q5 is connected to the memory node n2. The substrate electrode of the nMOS transistor Q5 is connected to the substrate power supply line VB2. The nMOS transistor Q6 has a source terminal connected to the power supply line GND. The drain terminal of the nMOS transistor Q6 is connected to the memory node n2. The gate electrode of the nMOS transistor Q6 is connected to the memory node n1. The substrate electrode of the nMOS transistor Q6 is connected to the substrate power supply line VB2.

The internal circuit 1 comprises a sequence circuit for memorizing data therein and a combination circuit having an NAND gate, an NOR gate, and inverter and so on, in addition to the latch circuit illustrated in FIG. 1. In addition, the internal circuit 1 may be, for example, a memory circuit such as static random access memory (SRAM) having the illustrated latch circuit as one memory cell.

The transistors Q3 to Q6 are formed on a semiconductor substrate so that the transistors Q3 to Q6 has a threshold voltage lower in absolute value than the transistors QA1 to QA3.

The control signals CS1 and CSB1 are produced by a control circuit (not depicted) of the semiconductor integrated circuit, and are complementary signals which are representative of whether the internal circuit 1 is at the active state or the sleep state. When the internal circuit 1 is at the active state, the control signals CS1 and CB1 have H level and L level, respectively. When the internal circuit 1 is at the sleep state, the control signals CS1 and CB1 have L level and H level, respectively. As a result, when the internal circuit is at the active state, both the MOS transistors QA1 and QA2 is put into ON state, while the pMOS transistor QA3 is put into OFF state. In addition, the charge pump circuit 10 stops the operation so that the substrate power supply line VB2 is connected to the power supply line GND.

On the other hand, each of the transistors QA1 to QA3 becomes a conductive state which is reverse to the active state. In other words, each of the pMOS transistors QA1 and QA2 is put into OFF state and the pMOS transistor QA3 is put into ON state when the internal circuit is at the sleep state. The charge pump circuit 10 operates to feed the substrate power supply line VB2 with a potential lower than that of the power supply line GND.

The voltage of voltage value LVDD is applied from a power supply pin 7 to the power supply line VDD1. From a power supply pin 8 which is used as an external input pin of a semiconductor chip, the power supply line VDD2 is supplied with the voltage having a voltage value HVDD higher than voltage value LVDD. In addition, the power supply line VDD3 is supplied with the voltage having a voltage value PVDD, through a power supply pin 9 which is used as an external input pin. Here, the voltage values LVDD and HVDD are equal to 1.0 V and 2.5 V, respectively. The voltage value PVDD is equal to the voltage value HVDD. On the other hand, the power supply line GND is supplied with a ground potential, i.e. 0 V, through a ground pin 6 which is used as an external input pin. The power supply lines VDD1, VDD2, GND, and VDD3 are fixed to the voltage values LVDD, HVDD, GND, and PVDD, respectively.

Figure 5:
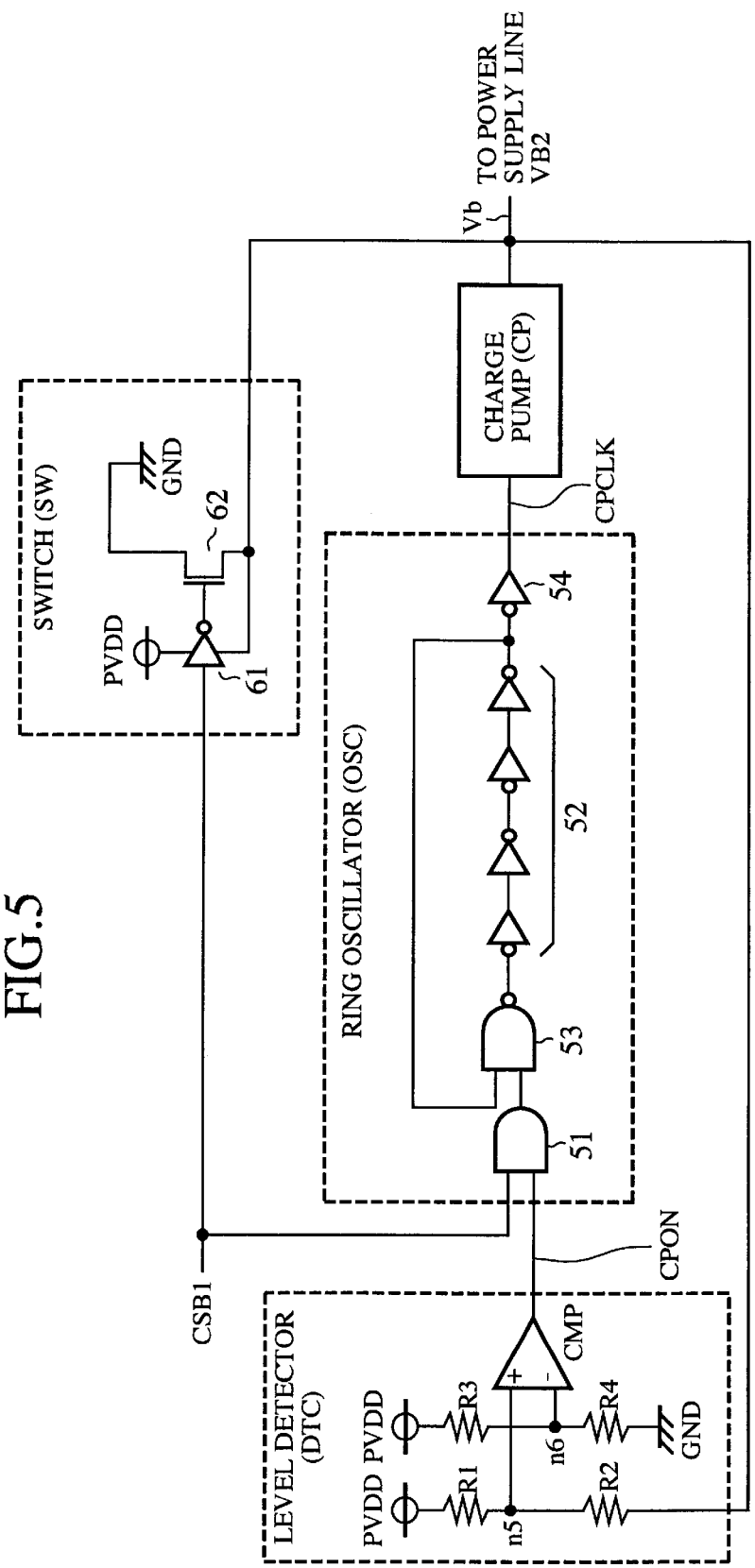
FIG. 5 is a circuit diagram for illustrating a charge pump 10 illustrated in FIG.1.

FIG. 5 is a circuit diagram of the charge pump circuit 10. The charge pump circuit 10 comprises a ring oscillator OSC, a charge pump CP, a switch SW, and a level detector DTC.

In accordance with the control signal CSB1 and a detection signal CPON which is outputted from the level detector DTC, the ring oscillator OSC produces an oscillation signal CPCLK with amplitudes of the levels of PVDD and GND (0 V). Specifically, the ring oscillator OSC oscillates only when each of the control signal CSB1 and the detection signal CPON has H level. The ring oscillator OSC stops the oscillation when each of the control signals CSB1 and the detection signal CPON does not have H level.

The above-mentioned ring oscillator OSC may be composed of an AND gate 51, an inverter group 52, an NAND gate 53, and an inverter 54. The control signal CSB1 and the detection signal CPON are inputted to the AND gate 51. The inverter group 52 has inverters of an even number that are connected to one another in series. Receiving the outputs of the AND gate 51 and the last stage of the inverter group 52, the NAND gate 53 produces an output, and it is supplied to the first stage of the inverter group 52. The inverter 54 serves as a driver, which receives the output of the last stage of the inverter group 52. The AND gate 51 is a logic circuit which detects that the internal circuit is at the sleep state and that a voltage Vb is higher than a predetermined voltage. The NAND gate 53 is a logic circuit which controls the oscillations of the oscillator OSC in response to the detection results of the detecting logic gate. When each of the control signal CSB1 and the detection signal CPON has the H level at the same time, the AND gate 51 outputs the H level (PVDD). The loop of the inverter group 52 and the NAND gate 53 is equivalent of a ring shape in which inverters of an odd number are connected to one another, with the result that the oscillator OSC may oscillate. When each of the control signal CSB1 and the detection signal CPON does not have H level, the output of the NAND gate 53 is fixed to H level. Thus, the oscillator OSC stops the oscillation since the signal CPCLK is fixed to L level (0 V).

The charge pump CP produces the voltage Vb in accordance with the oscillation signal CPCLK outputted from the ring oscillator OSC. The voltage Vb is supplied to the substrate power supply line VB2. The charge pump CP is a known circuit which charges an electric charge to the substrate power supply line VB2 in a direction of negative voltage, when the oscillation signal CPCLK is under the oscillation. The charge pump CP stops such a charging when the oscillation signal CPCLK is at a stopping state (L level) The charge pump CP is configured to be capable of charging the substrate power supply line VB2 up to a voltage lower than −1.6 V.

The switch SW is put into ON state when the internal circuit is at the active state. Because of that ON state, the switch SW connects the substrate power supply line VB2 to the power supply line GND. Thus, the voltage of the substrate power supply line VB2 is fixed forcedly to the ground voltage on the active state. Although the charge pump CP stops charging the electric charge to the substrate power supply line VB2 when the internal circuit 1 varies from the sleep state to the active state, it is possible to change quickly the substrate power supply line VB2 to the ground voltage by the switch SW. Specifically, the A switch SW comprises a CMOS inverter 61 and an nMOS transistor 62. The CMOS inverter 61 uses the voltage PVDD and the voltage Vb as two power sources and inverts the logic of the control signal CSB1. The nMOS transistor 62 receives the output of the inverter 61 at the gate terminal of the NMOS transistor 62. The nMOS transistor 62 has two source-drain terminals connected to the power supply line GND and the substrate power supply line VB2, respectively. When the control signal CSB1 has L level, the inverter 61 outputs the voltage of the PVDD level, to put the nMOS transistor 62 into ON state. In addition, the inverter 61 outputs the voltage of the Vb level, to put the nMOS transistor 62 into OFF state when the control signal CSB1 has H level.

The level detector DCT compares the voltage Vb with the predetermined voltage (negative voltage) and outputs the detection signal CPON. The predetermined voltage corresponds to the negative voltage value of −1.6 V that is supplied to the substrate power supply line VB2 when the internal circuit is at the sleep state. When the voltage Vb is higher than the predetermined voltage, the level detector DCT brings the detection signal CPON to H level (PVDD). When the voltage Vb is not higher than the predetermined voltage, the level detector DCT brings the detection signal CPON to L level (0 V).

Such a level detector DCT may comprise resistors R1 to R4 and a comparator CMP. For example, the resistor R1 is connected between the voltage PVDD and a node n5. The resistor R2 is connected between the node n5 and the substrate power supply line VB2. The resistor R3 is connected between the voltage PVDD and a node n6. The resistor R4 is connected between the node n6 and the power supply line GND. The comparator CMP has an input terminal of + side and an input terminal of − side which are connected to the node n5 and the node n6; respectively. The comparator CMP outputs the detection signal CPON. When the predetermined voltage is VB2 set, the resistance may be determined in each of the resistors R1 to R4 so as to provide a relationship of:

$$PVDD \times R4/(R3+R4) = \{(PVDD - VB2\text{set}) \times R2/(R1+R2)\} + VB2\text{set}$$

Accordingly, the substrate power supply line VB2 has 0 V when the internal circuit varies from the active state to the sleep state. After the internal circuit is put into the sleep state, the ring oscillator OSC oscillates while the voltage is higher than the predetermined voltage. The charge pump CP charges the electric charge to the substrate power supply line VB2 in the direction from 0 V to the negative voltage. When the voltage Vb is not higher than the predetermined voltage, the ring oscillator OSC stops the oscillation so that the charge pump CP stops charging the electric charge to the substrate power supply line VB2. During that time duration, the voltage Vb gradually rises inasmuch as the electric charge flows from the substrate power supply line VB2 to the substrate. When the voltage Vb becomes higher than the predetermined voltage, the ring oscillator OSC again oscillates so that the charge pump CP charges the electric charge to the substrate power supply line VB2 in the direction to the negative voltage. By repeating such an operation, the voltage Vb is approximately stabilized to the predetermined voltage of −1.6 V in the substrate power supply line VB2.

Figure 2:
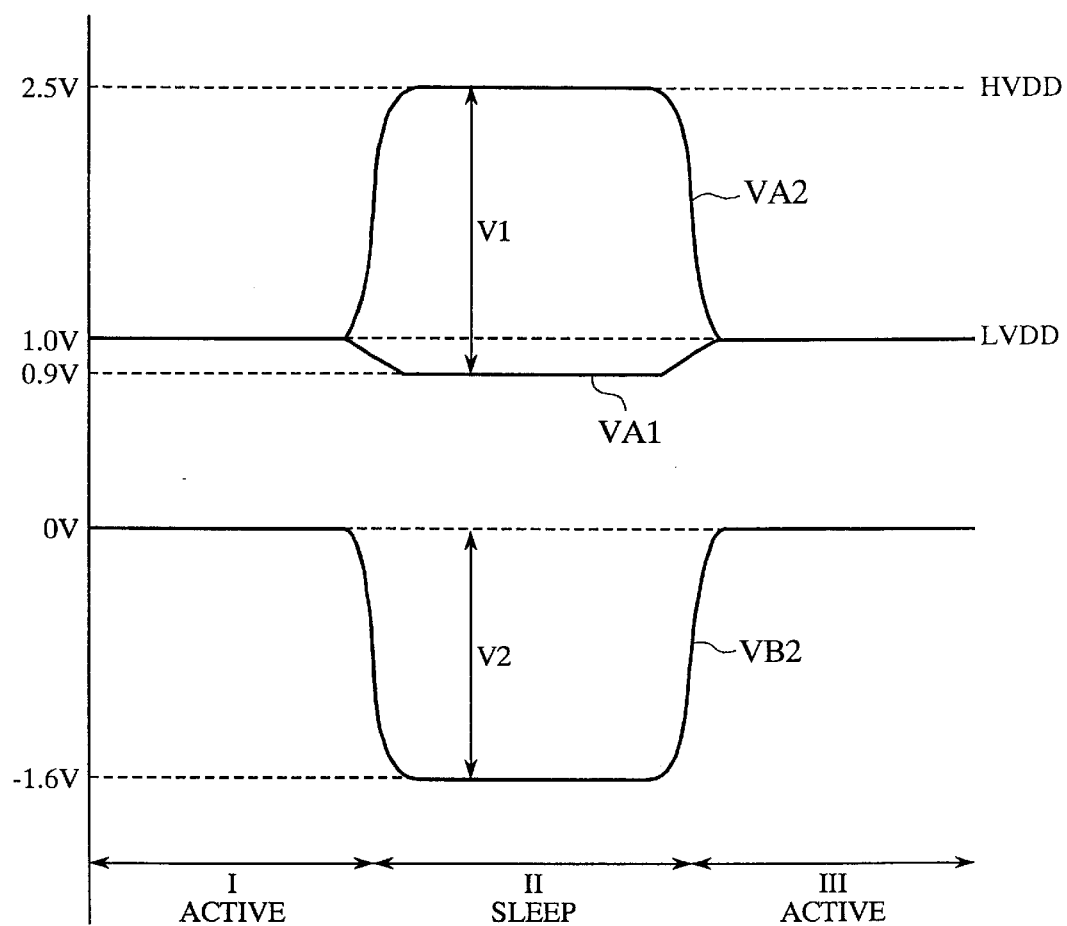
FIG. 2 shows signal waves for describing an operation of the semiconductor integrated circuit illustrated in FIG. 1.

Next, the description will proceed to an operation of the above-mentioned semiconductor integrated circuit with reference to a timing chart illustrated in FIG. 2. In FIG. 2, three solid lines show the progressions of voltages over time in the virtual power-supply line VA1 and the substrate power supply lines VA2 and VB2, respectively.

In a first time duration I during which the internal circuit is at the active state, the pMOS transistors QA1 and QA2 are simultaneously put into ON state in accordance with the control signal CSB1 and supply the voltage LVDD to the virtual power supply line VA1 and the substrate power supply line VA2, respectively. On the other hand, the pMOS transistor QA3 is put into OFF state in accordance with the control signal CS1. In addition, the charge pump circuit 10 stops the operation in response to the control signal CSB1 and connects the substrate power supply line VB2 to the ground. As a result, the internal circuit 1 operates in a manner similar to a normal CMOS circuit under the voltage LVDD.

The internal circuit is changed from the active state to the sleep state by the control signals CS1 and CSB1. In a second time duration II corresponding to the sleep state, the PMOS transistors QA1 and QA2 are put into OFF state in accordance with the control signal CSB1. On the other hand, the pMOS transistor QA3 is put into ON state in accordance with the control signal CS1 and supplies the voltage HVDD to the substrate power supply line VA2. In addition, a voltage drop occurs from the substrate power supply line VA2 to the virtual power supply line VA1 by the threshold voltage of the diode D1 inasmuch as the diode D1 is biased in a forward direction. As a result, the virtual power supply line VA1 is supplied with the voltage of (HVDD−V1).

Therefore, the substrate potential is higher by voltage V1 than the source potential in the pMOS transistors Q3 and Q4 of the internal circuit 1. Because of such a reverse-bias state, the absolute value of the threshold voltage increases. As a result, it is possible to reduce the leakage current which may occur in the pMOS transistors Q3 and Q4 at the sleep state.

Figure 4:
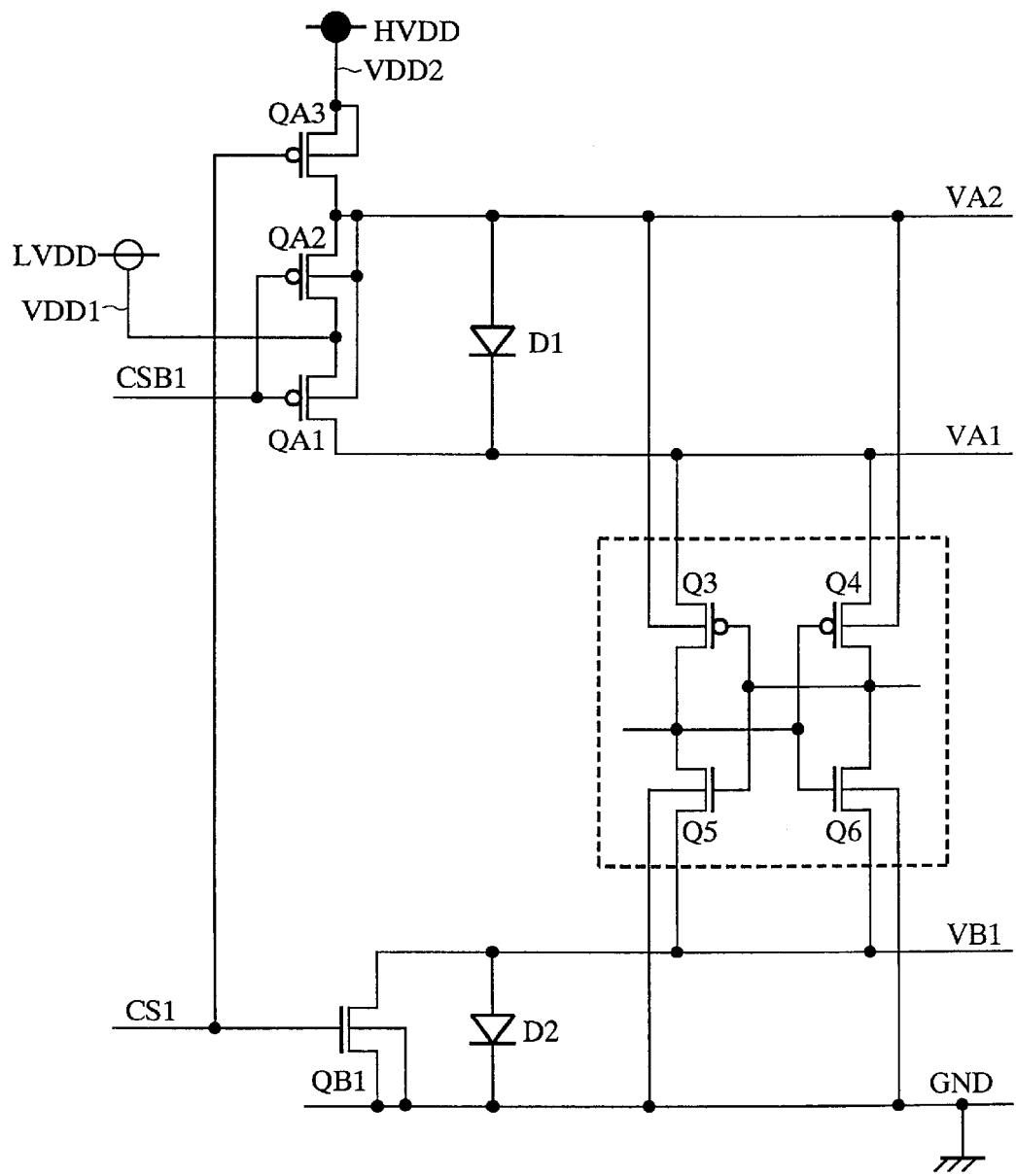
FIG. 4 is a circuit diagram for illustrating a conventional semiconductor integrated circuit.

Here, the voltage V1 is set to 1.6 V so that the virtual power supply line VA1 may be supplied with the voltage of 0.9 V, in order that the internal circuit 1 is supplied with the supply voltage of 0.9 V required for holding the data in the internal circuit 1 at the sleep state. The voltage V1 is twice as high as that obtained by the conventional circuit illustrated in FIG. 4. As described above, it is possible effectively to reduce the leakage current inasmuch as it is possible to enlarge the reverse bias voltage even if the voltage HVDD is put to a lowered voltage.

Figure 6A:
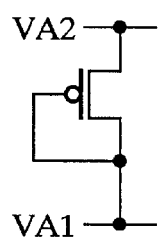
FIGS. 6A, 6B, and 6C are circuit diagrams for illustrating other examples of a voltage dropping circuit 2 illustrated in FIG. 1.
Figure 6B:
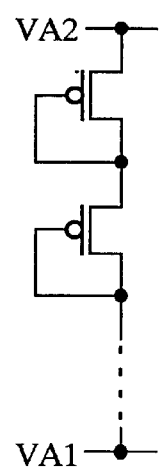
Figure 6C:
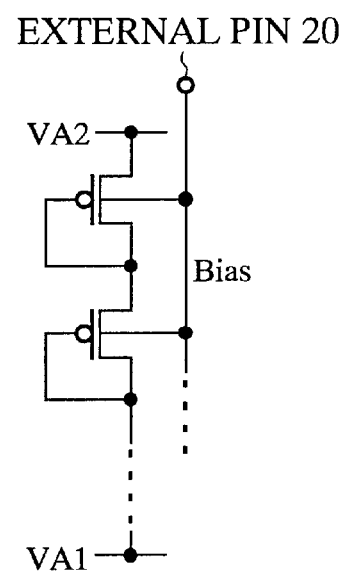

In general, the diode has the threshold voltage of about 0.6 V. It is possible to perform the threshold voltage higher than 0.6 V by the following fashion in the above-mentioned embodiment. Instead of the diode element as the voltage dropping circuit 2, the pMOS transistor or the nMOS transistor is used in which the gate electrode is connected to the drain electrode. FIG. 6A is an example which uses the pMOS transistor instead of the diode element. Thus, it is possible to obtain an arbitrary voltage corresponding to the transistor size. In addition, it is possible to obtain a higher voltage when a plurality of MOS transistors each of which the gate is connected to the own drain are connected to each other in series between the wirings VA1 and VA2, as shown in FIG. 6B. Furthermore, the plurality of the pMOS transistors are connected in series, and it is possible to adjust the threshold voltage when a voltage bias is adjusted which is supplied to the substrate electrode of each MOS transistor whose gate is connected to the own drain, as shown in FIG. 6C. Although the voltage bias is supplied from the external input pin 20 of the semiconductor chip to the substrate electrode, in FIG. 6C, the voltage bias may be produced in the semiconductor chip. Although a plurality of MOS transistors are illustrated in FIG. 6C, needless to say, a single MOS transistor can be used instead.

In addition, the charge pump circuit 10 operates in response to the control signal CSB1, and supplies the substrate power supply line VB2 with the negative voltage V2 which is lower than the ground potential, when the internal circuit is at the sleep state. In the above description, the voltage V2 is equal to −1.6 V whose absolute value equal to the voltage V1. As a result, it is possible to reduce the leakage current which occurs in each of the nMOS transistors Q5 and Q6, in reasons similar to each of the pMOS transistors.

In a third time duration III during which the internal circuit returns back to the active state, the virtual power supply line VA1 and the substrate power supply lines VA2 and VB2 are supplied with the voltages equal to the voltages which are supplied to the virtual power supply line VA1 and the substrate power supply lines VA2 and VB2 in the first time duration I. The absolute value of the threshold voltage decreases in each MOS transistor of the internal circuit 1 in comparison with the sleep state. As a result, each MOS transistor of the internal circuit 1 operates at a high speed.

Although the supply voltage PVDD of the charge pump circuit 10 is equal to the voltage HVDD in the above description, the supply voltage PVDD may be different from the voltage HVDD. In addition, the charge pump circuit 10 may be connected to the power supply line VDD1 or VDD2, although the charge pump circuit 10 is connected to the power supply line VDD3 in FIG. 1.

EMBODIMENT 2

Figure 3:
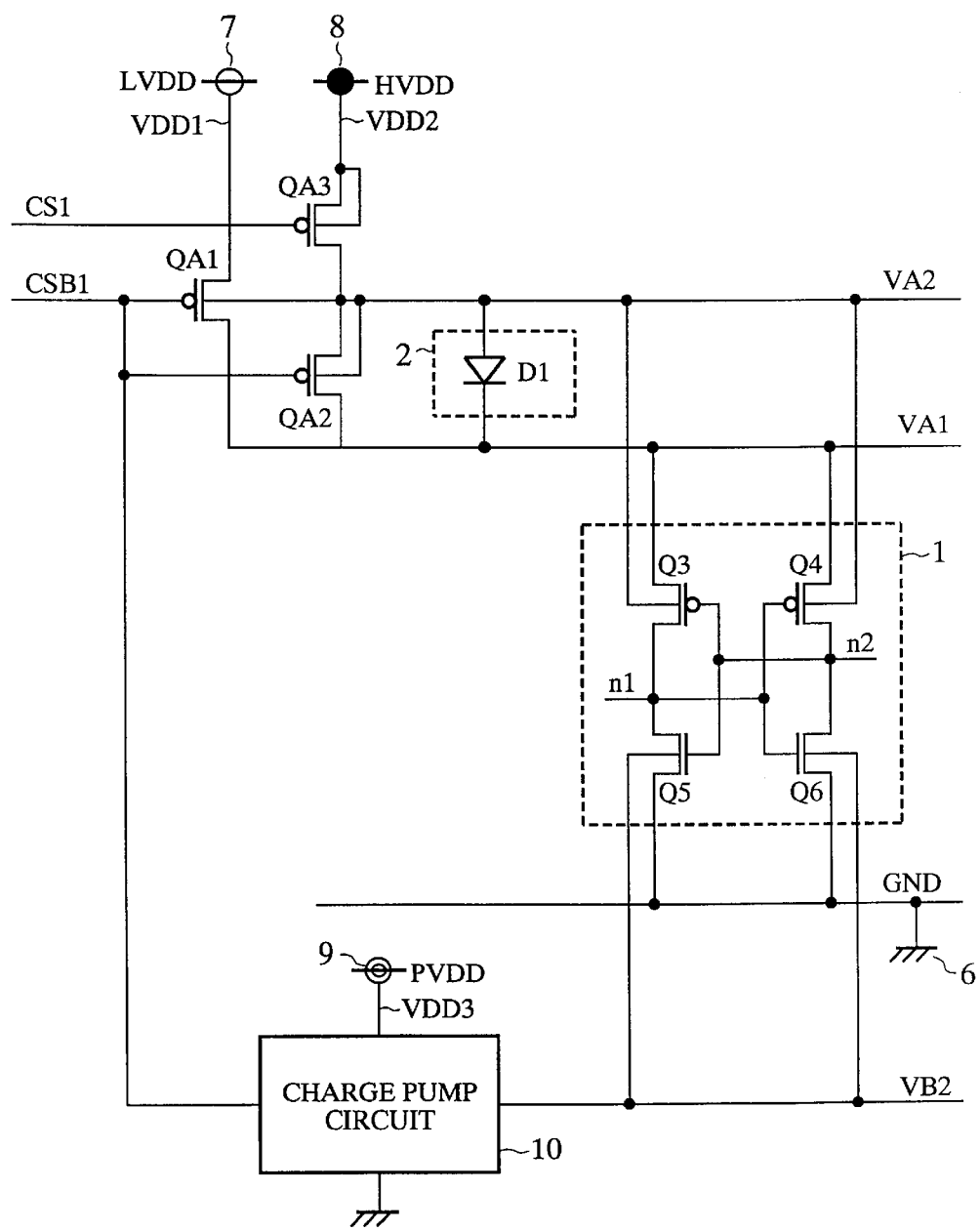
FIG. 3 is a circuit diagram for illustrating a semiconductor integrated circuit according to an embodiment 2 of this invention.

FIG. 3 is a circuit diagram for illustrating a semiconductor integrated circuit according to an embodiment 2 of this invention. The description will be made of only parts which are different in structure from the semiconductor integrated circuit in FIG. 1. In the semiconductor integrated circuit illustrated in FIG. 3, one of the source-drain electrodes is connected to the virtual power supply line VA1 and the other source-drain electrode is connected to the substrate power supply line VA2 in the pMOS transistor QA2. Connections of the substrate electrode and the gate electrode are made in a similar manner to FIG. 1.

On the active state and the sleep state, each of the transistors QA1 to QA3 is put into ON state or OFF state as described in the embodiment 1, in the semiconductor integrated circuit illustrated in FIG. 3. The charge pump circuit 10 also operates as in the embodiment 1. On the sleep state, the virtual power supply line VA1 and the substrate power supply lines VA2 and VB2 are supplied with the same voltage values in the embodiment 1.

On the active state, the virtual power supply line VA1 and the substrate power supply lines VA2 and VB2 are supplied with the voltage values similar to the embodiment 1. Incidentally, the substrate power supply line VA2 may be supplied with a voltage value different from that of the embodiment 1, considering strictly the phenomenon called an IR drop.

Although the virtual power supply line VA1 on the active state has the voltage of LVDD in the embodiment 1 as is readily understood from FIG. 2, the virtual power supply line VA1 exactly has the voltage of (LVDD−ΔVA1) since there is an occurrences of a voltage drop due to the wiring resistance of the power supply line VDD1, the ON-resistance of the pMOS transistor QA1 and so on, in case of taking the IR drop into consideration. In FIG. 1, the substrate power supply line VA2 has the voltage of (LVDD−ΔVA2) due to the voltage drop caused by the ON-resistance of the pMOS transistor QA2 and so on. At that time, the voltage drop of the virtual power supply line VA1 is remarkable greater than that of the substrate power supply line VA2. As a result, a relationship of ΔVA1>>ΔVA2 holds inasmuch as the leakage current will be negligible which flows from the substrate power supply line VA2 through transistors Q3 and Q4, as compared with an active current which flows from the virtual power supply line VA1 to the power supply line GND when the internal circuit operates. In the embodiment 1, the substrate potential is higher by (ΔVA1−ΔVA2) than the source potential in each of the transistors Q3 and Q4. On the basis of the reverse bias, the absolute value of the threshold voltage increases in the transistors Q3 and Q4. Therefore, the transistors Q3 and Q4 becomes slow in operation.

On the other hand, the substrate power supply line VA2 has a voltage value of (LVDD−ΔVA1−ΔVA2) in FIG. 3. The substrate potential is lower by ΔVA2 than the source potential in each of the transistors Q3 and Q4. By such a forward bias state, the absolute value of the threshold voltage is reduced in the transistors Q3 and Q4. Therefore, the operation speed of the transistors Q3 and Q4 is improved.

Incidentally, Japanese Patent Application 12-36616 (2000) also describes the structures related to the transistors QA1, QA2, and QA3, the voltage dropping circuit 2, and the power supply lines VA1 and VA2 in the semiconductor integrated circuit of the present embodiment.

The voltage drop by the diode is used for only the pMOS transistors, while the charge pump circuit is used for the nMOS transistors in the present embodiment. Thus, it is possible to perform an enhanced reverse bias voltage even if the voltage HVDD is brought to a lowered voltage. As a result, it is also possible to effectively reduce the leakage current in the embodiment 2.

In the embodiments 1 and 2, although the switches QA1, QA2, and QA3 are provided as the power control circuit which supplies the substrate power supply line VA2 with the voltage LVDD on the active state and which supplies the substrate power supply line VA2 with the voltage HVDD on the sleep state, the power control circuit is not limited to the switches QA1, QA2, and QA3. For example, in a manner similar to FIG. 6 in JP-A 11-214962 (1999), while two source-drain terminals of the pMOS transistor QA1 which receives the control signal CSB1 at its gate electrode are respectively connected between the virtual power supply line VA1 and the substrate power supply line VA2, the semiconductor integrated circuit may be newly provided with a DC-DC converter such that the voltage LVDD (1.0 V) is supplied to the substrate power supply line VA2 on the active state, while the voltage HVDD (2.5 V) supplied thereto on the sleep state, selectively, instead of the pMOS transistors QA2 and QA3.

As described above, according to this invention, regardless of the active or sleep state, a voltage is fixed, which should be supplied to the source electrode of the n-channel field effect transistor of the internal circuit. Accordingly, even if a voltage between the two power supply lines which are connected to the internal circuit is ensured so that the internal circuit can hold the data therein even on the sleep state, it is possible to supply the substrate electrode of the p-channel field effect transistor with a reverse bias which is greater than the prior art. As a result, it is possible to effectively reduce the leakage current. In addition, the absolute value of the threshold voltage is enlarged in the n-channel field effect transistor inasmuch as the substrate electrode of the n-channel field effect transistor of the internal circuit is supplied with the voltage lower than the voltage supplied to the source electrode of the n-channel field effect transistor. As a result, it is possible to reduce the leakage current.

What is claimed is:

1. A semiconductor integrated circuit comprising:
    a first power supply line;
    a first switch which is put into ON state to supply a first voltage to said first power supply line;
    a second power supply line;
    a voltage dropping circuit, arranged between said first power supply line and said second power supply line, for supplying said first power supply line with a voltage which is obtained by dropping the voltage of said second power supply line, when said first switch is put into OFF state;
    a third power supply line which is set to a second voltage lower than said first voltage;
    a fourth power supply line;
    a voltage generating circuit for generating a third voltage lower than said second voltage, to supply said third voltage to said fourth power supply line when said first switch is put into OFF state, said voltage generating circuit generating a voltage higher than said third voltage and supplying said voltage to said fourth power supply line when said first switch is put into ON state; and
    an internal circuit including a p-channel field effect transistor and an n-channel field effect transistor, said p-channel field effect transistor having a source terminal and a substrate electrode which are connected to said first power supply line and said second power supply line, respectively, said n-channel field effect transistor having a source terminal and a substrate electrode which are connected to said third power supply line and said fourth power supply line, respectively.

2. A semiconductor integrated circuit according to claim 1, wherein said voltage generating circuit comprises:
    an oscillator for generating an oscillation signal having a predetermined amplitude when said first switch is put into OFF state, said oscillator stopping generation of the oscillation signal when said first switch is put into ON state; and
    a charge pump for generating said third voltage in accordance with said oscillation signal which is generated from said oscillator.

3. A semiconductor integrated circuit according to claim 2, wherein:
    said voltage generating circuit further comprises a level detector for comparing a predetermined voltage with the voltage of said fourth power supply line, to produce a comparison result between said predetermined voltage and the voltage of said fourth power supply line; and
    said oscillator generating said oscillation signal in accordance with the comparison result produced by said level detector.

4. A semiconductor integrated circuit according to claim 2, wherein said voltage generating circuit further comprises a switch circuit connected to said third and said fourth power supply lines, said switch circuit being put into ON state when said first switch is put into ON state.

5. A semiconductor integrated circuit according to claim 1, further comprising a voltage control circuit for supplying said second power supply line with a fourth voltage higher than the first voltage which is supplied to said first power supply line on putting said first switch into ON state, when said first switch is put into OFF state.

6. A semiconductor integrated circuit according to claim 5, wherein:
    said voltage control circuit comprises:
        a second switch, connected to said second power supply line, for being put into ON state when said first switch is put into ON state; and
        a third switch, connected to said second power supply line, for being put into ON state to supply said fourth voltage to said second power supply line;
        said first switch having first terminal and second terminals which are connected to said second switch and said first power supply line, respectively, said first terminal being supplied with a supply voltage.

7. A semiconductor integrated circuit according to claim 5, wherein:
    said voltage control circuit comprises:
        a second switch connected to said first and second power supply lines for being put into ON state when said first switch is put into ON state; and
        a third switch connected to said second power supply line for being put into ON state to supply said fourth voltage to said second power supply line;
        said first switch having a first terminal which is supplied with a supply voltage, said first switch having a second terminal which is connected to said second switch and said first power supply line.

8. A semiconductor integrated circuit according to claim 1, wherein said voltage dropping circuit includes a diode or a plurality of diodes connected to one another in series, said diode or said diodes being located between said first and said second power supply lines.

9. A semiconductor integrated circuit according to claim 1, wherein said voltage dropping circuit includes a field effect transistor or a plurality of field effect transistors connected to one another in series, said field effect transistor or said field effect transistors being connected between said first and said second power supply lines.

10. A semiconductor integrated circuit according to claim 9, wherein a voltage is varied which is supplied to a substrate electrode of said field effect transistor or each of said field effect transistors.

* * * * *